US007639410B2

(12) United States Patent
Wang et al.

(10) Patent No.: US 7,639,410 B2
(45) Date of Patent: Dec. 29, 2009

(54) OPTIMAL TEST PATCH SELECTION FOR MULTI-MEDIA PRINTING SYSTEMS USING LOW RANK APPROXIMATION

(75) Inventors: Yao Rong Wang, Webster, NY (US); Lalit Keshav Mestha, Fairport, NY (US); Zhigang Fan, Webster, NY (US); Alvaro Enrique Gil, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 584 days.

(21) Appl. No.: 11/636,841

(22) Filed: Dec. 11, 2006

(65) Prior Publication Data

US 2008/0137150 A1 Jun. 12, 2008

(51) Int. Cl.
*H04N 1/46* (2006.01)
*G03F 3/08* (2006.01)

(52) U.S. Cl. ....................................... 358/504; 358/518

(58) Field of Classification Search .................. 358/504
See application file for complete search history.

(56) References Cited

U.S. PATENT DOCUMENTS

| | | | | |
|---|---|---|---|---|
| 4,553,033 | A | 11/1985 | Hubble, III et al. | |
| 5,749,020 | A | 5/1998 | Mestha et al. | |
| 5,963,244 | A | 10/1999 | Mestha | |
| 6,008,912 | A * | 12/1999 | Sato et al. | 358/518 |
| 6,744,531 | B1 | 6/2004 | Mestha et al. | |
| 6,760,056 | B2 | 7/2004 | Klassen et al. | |
| 6,934,053 | B1 | 8/2005 | Mestha et al. | |
| 2004/0136015 | A1 | 7/2004 | Van de Capelle et al. | |
| 2005/0036705 | A1 | 2/2005 | Viassolo et al. | |
| 2005/0099446 | A1 | 5/2005 | Mizes et al. | |
| 2006/0077488 | A1 | 4/2006 | Zhang et al. | |
| 2006/0077489 | A1 | 4/2006 | Zhang et al. | |

OTHER PUBLICATIONS

U.S. Appl. No. 11/636,747, Filed Dec. 11, 2006, Mestha et al.
U.S. Appl. No. 11/314,104, filed Dec. 21, 2005, Fan, et al.
U.S. Appl. No. 11/314,670, filed Dec. 21, 2005, Fan, et al.
U.S. Appl. No. 11/313,018, filed Dec. 20, 2005, Mizes, et al.

* cited by examiner

*Primary Examiner*—Mark K Zimmerman
*Assistant Examiner*—Oleg Roytburd
(74) *Attorney, Agent, or Firm*—Fay Sharpe LLP

(57) ABSTRACT

The exemplary embodiment disclosed herein comprises several aspects of defining and using optimal color test patches for calibrating a printing system for various purposes (e.g., multi-media, gamut extension, drifting correction, etc.). One aspect is the creation and use of color patches where the color patches are selected optimally to result in minimum mean square error when those color patches are used to determine weights of a limited number of basis vectors that model the system (e.g., model the print engine response). A joint optimization technique is given as a method to select the optimal color test patches for calibration.

15 Claims, 4 Drawing Sheets

OPTIMAL TEST PATCH SELECTION FOR MULTI-MEDIA PRINTING SYSTEMS USING LOW RANK APPROXIMATION

BACKGROUND

The exemplary embodiment relates generally to improved methods and systems for selecting optimal test patches for printing systems using low rank approximation. It finds particular application in conjunction with document processing and image processing systems and will be described with particular reference thereto. However, it is to be appreciated that some embodiments may be amenable to other applications.

Maintaining consistent and uniform tones is a desired goal in most, if not all, image rendering processes and devices. In other words, it is desirable for an image to appear the same no matter which rendering system renders the image and no matter how many times an image is rendered on a particular system. The image should exhibit, for example, the same lightness or hue each time it is rendered on a given system and no matter on which system it is rendered. For this reason, rendering engines, such as print engines in a printing system, are put through a characterization process in order to determine appropriate compensation values for a particular engine. While this characterization process is useful in determining an initial set of compensation levels for a particular engine, it is often desirable to perform later calibrations to account for variations in the required compensation over time. For example, in printing systems, it is common to use tone reproduction curves (TRCs), which are determined during the initial characterization process. These TRCs can then be updated, calibrated or recalibrated overtime by periodically printing test patches at various calibration levels and sensing the printed test patches to determine appropriate compensations for the initial TRCs so that the new TRCs can give appropriate compensation for the current state of a drifted print engine.

Where image data is available in a contone format, TRCs can be used to adjust pixel values to compensate for the characteristics of a particular rendering engine. During the calibration process, a calibration image is rendered by the rendering engine, and a sensor is used to measure or analyze an aspect of the rendered image. For example, the image generally includes portions that are meant to be rendered to have the same lightness or shade of gray. Therefore, the lightness or shade of gray of the rendered image is measured. The measurements may then be used to generate an engine response curve (ERC). The engine response curve may describe a response, such as an average response, over the entire area of the diagnostic or calibration image.

Engine response curves and tone reproduction curves are referred to as curves because the information they contain or are associated with may sometimes be displayed or discussed as a plot of data points. However, information related to both ERCs and compensating TRCs may be stored or manipulated as tables of data, sets of coefficients and/or constants associated with equations, or by other means, as may be convenient.

As indicated above, compensating TRCs are useful for compensating pixel-described input to produce desired colors or shades of gray with a relatively fine resolution. For example, compensating TRCs are useful where image pixels describe an input or desired color with one or more values in a relatively broad range of, for example, 0-255. Such pixels are said to describe an input or desired color or desired shade of gray with contone values. In such systems, one may select an appropriate compensating TRC for a pixel location in rendered image space based on a contone value of the input pixel and look-up and/or calculate a compensated contone value based on the selected compensating TRC.

It has been found that basis vector representation of various aspects of print engine response is useful. The basis vector methodology provides a formalism that significantly aids in efficiently representing and controlling print engine response while rejecting uncorrelated noise. The benefits of basis function representation are realized via low rank approximation.

Some of the practical applications of basis function representation include (1) time-zero calibration (see U.S. Pat. No. 5,749,020, entitled COORDINIZATION OF TONE REPRODUCTION CURVE IN TERMS OF BASIS FUNCTIONS, to L. K. Mestha et al.), (2) temporal drift correction (see U.S. application Ser. No. 11/314,104, filed Dec. 21, 2005, entitled "SYSTEM AND METHOD FOR IMAGE BASED CONTROL USING INLINE SENSORS," by Zhigang Fan, et al.), and (3) the XIA02 spatially compensating TRCs. Other examples include spatial TRCs for multiple halftones, and controlling for consistency on different media, halftones, colors (or gray levels), and across multiple printers. In these applications, the variations of the printing system are characterized as a weighted summation of a few eigen functions.

A consideration within the above applications and for calibration in general is the selection of gray levels and color patches for sampling. Conventional interpolation-based calibration methods, as well as previously developed low-rank approximation-based methods, have been employing sample patches that are selected in an ad hoc or heuristic manner. Defining a minimal set becomes increasingly important when considering the multitude of variables that must be comprehended under calibration and control (e.g., colors, halftones, media, printers, etc.). In contrast to prior methods, U.S. application Ser. No. 11/314,670, filed Dec. 21, 2005, entitled "OPTIMAL TEST PATCH LEVEL SELECTION FOR SYSTEMS THAT ARE MODELED USING LOW RANK EIGEN FUNCTIONS, WITH APPLICATIONS TO FEEDBACK CONTROLS," by Zhigang Fan, et al., further develops the low rank approximation method to provide a theoretically optimal algorithm to ensure measurement accuracy and efficiency with a minimal variable set. Minimizing the number of samples reduces the computation and memory requirements as well as the spatial extent of the test patches. The result is a minimization of cost and enablement of more frequent sampling and more applications.

Nonetheless, there is a need for extending the theory developed in U.S. application Ser. No. 11/314,670 to calibrations that require color patches over the whole printer gamut. There are at least two aspects of the exemplary embodiment that differ from U.S. application Ser. No. 11/314,670. First, whole-gamut calibration involves a large set of variables, such as the number of media and the number of color patches required. For example, a customer using a Xerox iGen3 printer may print more than 200 media, and to calibrate each media may require more than 200 color patches. In order to select the calibration patches over the entire gamut using the theory in U.S. application Ser. No. 11/314,670, one can print and measure off-line, say, thirteen levels of fineness for each C, M, and Y separation and their combination. This will result in $13^3=2197$ patches. Selecting 200 patches out of 2197 patches provides $2.57\times10^{289}$ possibilities. To exhaust all the possibilities as in U.S. application Ser. No. 11/314,670 is a difficult task. A large scale optimization method is therefore needed to apply the theory in U.S. application Ser. No. 11/314,670. Second, gray level (or single separation color patch) selection as in U.S. application Ser. No. 11/314,670 is generally used by printer manufacturers to calibrate the printer, while the whole-gamut calibration in the exemplary embodiment may also be used by a customer using the printer.

INCORPORATION BY REFERENCE

The following references, the disclosures of which are incorporated herein in their entireties by reference, are mentioned:

U.S. application Ser. No. 11/313,018, filed Dec. 20, 2005, entitled "METHODS AND APPARATUSES FOR CONTROLLING PRINT DENSITY," by Howard A. Mizes, et al., describes the characterization processes used for determining optimal optimal halftone screens.

U.S. Pat. No. 5,963,244, issued Oct. 5, 1999 to Mestha, entitled "Optimal reconstruction of tone reproduction curve," describes a method of machine control including the recreation of a tone reproduction curve by providing a look up table.

U.S. Pat. No. 5,749,020, issued May 5, 1998 to Mestha, entitled "COORDINIZATION OF TONE REPRODUCTION CURVE IN TERMS OF BASIS FUNCTIONS," describes fundamental machine functions, such as the Tone Reproduction Curve, that are divided into regions of smaller units so that each unit can be interrelated to some aspects of the internal machine process. In other words, a linear combination of basis functions is used to model the imaging system with respect to actuators for producing a predicted TRC.

U.S. Pat. No. 4,553,033, issued Nov. 12, 1985 to Hubble, entitled "INFRARED REFLECTANCE DENSITOMETER," describes an integral, compact infrared reflectance densitometer including a substrate supporting an LED, a control photodiode to compensate for component degradation, a background photodiode to compensate for background radiation, and a large area photodiode to provide an electrical signal representative of the amount of toner particles on the photosensitive surface.

U.S. Pat. No. 6,744,531, issued Jun. 1, 2004 to Mestha et al., entitled "COLOR ADJUSTMENT APPARATUS AND METHOD," describes an apparatus and method to achieve consistent output across plurality of different hardcopy devices.

U.S. Pat. No. 6,934,053, issued Aug. 23, 2005 to Mestha et al., entitled "METHODS FOR PRODUCING DEVICE AND ILLUMINATION INDEPENDENT COLOR REPRODUCTION," describes a method for obtaining spectrally matched color outputs using data from a real-time sensor, such as, for example, a spectrophotometer on the output trays of a marking device.

U.S. Publication No. 2004/0136015, published on Jul. 15, 2004, by Jean-Pierre R. N. Van de Capelle et al., entitled "ITERATIVE PRINTER CONTROL AND COLOR BALANCING SYSTEM AND METHOD USING A HIGH QUANTIZATION RESOLUTION HALFTONE ARRAY TO ACHIEVE IMPROVED IMAGE QUALITY WITH REDUCED PROCESSING OVERHEAD," describes a system and method to perform printer calibration spatially on the halftones while they are in a high quantization resolution form.

U.S. Pat. No. 6,760,056, issued Jul. 6, 2004 to Klassen et al., entitled "MACRO UNIFORMITY CORRECTION FOR X-Y SEPARABLE NON-UNIFORMITY," describes a describes a method for rendering a raster output level which determines an image position of a pixel of interest (POI) within an image. A final raster output level is determined as a function of the image position and the intended raster output level.

U.S. Publication No. 2005/0099446, published on May 12, 2005, by Mizes et al., entitled "SYSTEMS AND METHODS FOR COMPENSATING FOR STREAKS IN IMAGES," describes a method for compensating for streak defects in an image formed using an image forming device.

U.S. 2005/0036705, published on Feb. 17, 2005, by Viassolo et al., entitled "ACTIVE COMPENSATION OF STREAKS USING SPATIAL FILTERING AND FEEDBACK CONTROL," describes an image processing method for reducing streaking on a printed sheet.

U.S. application Ser. No. XX/XXX,XXX, filed concurrently, entitled "METHOD AND SYSTEM FOR IDENTIFYING OPTIMAL MEDIA FOR CALIBRATION AND CONTROL," by Lalit Keshav Mestha, et al., describes processes for determining optimal media for calibration and control.

U.S. Publication No. 2006/0077488, entitled METHODS AND SYSTEMS ACHIEVING PRINT UNIFORMITY USING REDUCED MEMORY OF COMPUTATIONAL REQUIREMENTS, by Zhigang Fan, et al., describes methods and systems that achieve print uniformity (i.e., streak compensation) using less memory or computational requirements to minimize the effects of streaks, printer noise and measurement noise.

U.S. Publication No. 2006/0077489, entitled UNIFORMITY COMPENSATION IN HALFTONED IMAGES, by Zhigang Fan, et al., describes a method of compensating for a spatial non-deformity in an image rendering device.

BRIEF DESCRIPTION

The exemplary embodiment disclosed herein comprises several aspects of defining and using optimal color test patches for calibrating a printing system for various purposes (e.g., multi-media, gamut extension, drifting correction, etc.). One aspect is the creation and use of color patches where the color patches are selected to result in minimum mean square error when those color patches are used to determine weights of a limited number of basis vectors that model the system (e.g., model the print engine response). A joint optimization technique is given as a method to select the optimal color test patches for calibration. The optimal color test patches are intended to be used in various applications, such as in multimedia calibration for Xerox's iGen3 printer, and for providing a calibration procedure for customers. The exemplary embodiment sets forth the calibration patch selection process in a systematic and optimal way and individualizes the calibration patches for each printing system and for each calibration purpose (e.g., multi-media, set point adjustments, etc.). The procedures disclosed herein are applicable to selection of color patches for 1D, 2D, or 3D calibration processes when single/multiple media optimization is involved. In addition, such procedures are applicable to select optimal gray values for Multi-Objective Color Control methods that unify the color consistency and uniformity corrections for single and multi-separations using full width array color sensors on belt/paper.

According to an aspect of the exemplary embodiment, there is provided a method of selecting optimal color test patches for an image rendering system. The method comprises: (a) initializing a set of values, where the set of values includes N number of colors used for calibration of the image rendering system, a computational tolerance number, and a delta-E tolerance number; (b) printing M colors and collecting data over a drift space; (c) forming a color-drifting data matrix P and performing singular value decomposition of the covariance matrix formed by the color-drifting data matrix P to determine the eigen functions; (d) determining the number of color eigenvectors that are required based on a delta-E curve and the delta-E tolerance number; (e) where M!/N!(M−N)! is greater than the computational tolerance number, selecting a plurality of components with the largest values from each color eigenvector and computing $J_1$; (f) computing $J_2$ by minimizing $J_1$ further; (g) where $J_2<J_1$, selecting N colors from step (f) as the optimal color set; and (h) where $J_2>J_1$, selecting N colors from step (e) as the optimal color set.

According to another aspect of the exemplary embodiment, there is provided an image rendering system comprising a user interface, a print engine, one or more color sensors, a database, and a controller. The controller is operative to: (a) initialize a set of values, where the set of values includes N number of colors used for calibration of the image rendering system, a computational tolerance number, and a delta-E tolerance number; (b) print M colors and collect data over a drift space; (c) form a color-drifting data matrix P and perform singular value decomposition of the covariance matrix formed by the color-drifting data matrix P; (d) determine the number of eigenvectors that are required from the delta-E curve and the delta-E tolerance data; (e) where M!/N!(M−N)! is greater than the computational tolerance number, select a plurality of components with the largest values from each color eigenvector and compute $J_1$; (f) compute $J_2$ by minimizing $J_1$ further; (g) select N colors from (f) as the optimal color set, where $J_2<J_1$; and (h) select N colors from (e) as the optimal color set, where $J_2>J_1$.

According to yet another aspect of the exemplary embodiment, there is provided a storage medium storing a set of program instructions executable on a data processing device and usable to select optimal color test patches for an image rendering system. The set of program instructions comprises: (a) instructions for initializing a set of values, where the set of values includes N number of colors used for calibration of the image rendering system, a computational tolerance number, and a delta-E tolerance number; (b) instructions for printing M colors and collecting data over a drift space; (c) instructions for forming a color-drifting data matrix P and performing singular value decomposition of the covariance matrix formed by the color-drifting data matrix P; (d) instructions for determining the number of eigenvectors that are required from the delta-E curve and the delta-E tolerance data; (e) instructions for selecting a plurality of components with the largest values from each color eigenvector and computing $J_1$, where M!/N!(M−N)! is greater than the computational tolerance number; (f) instructions for computing $J_2$ by minimizing $J_1$ further; (g) instructions for selecting N colors from (f) as the optimal color set, where $J_2<J_1$; and (h) instructions for selecting N colors from (e) as the optimal color set, where $J_2>J_1$.

DETAILED DESCRIPTION

Figure 1:
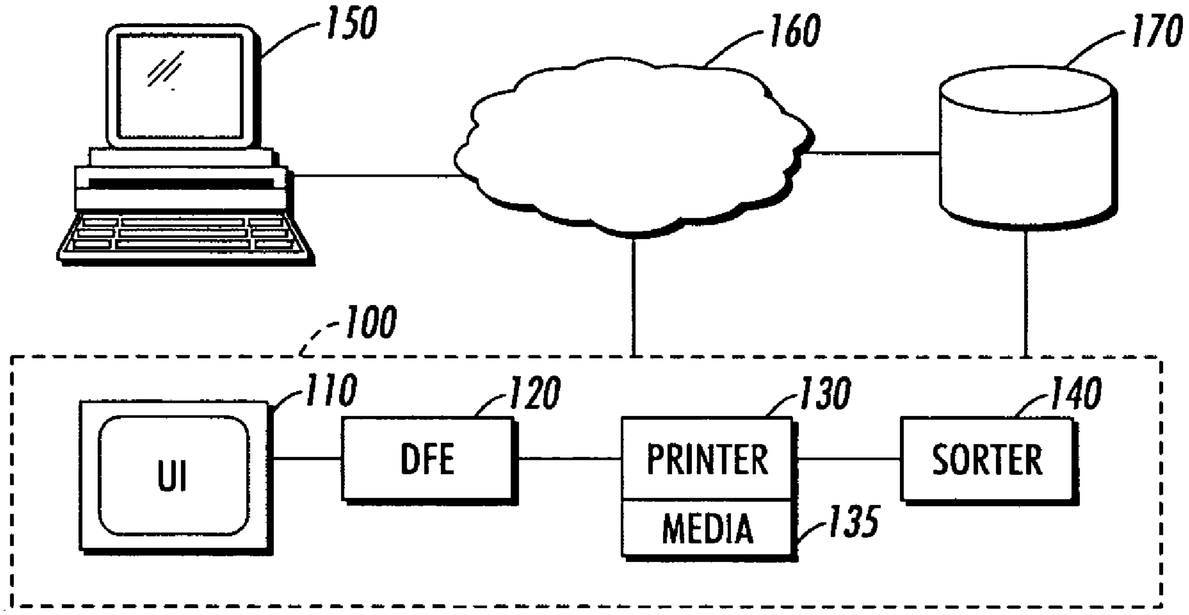
FIG. 1 illustrates components of a printing system utilized in accordance with carrying out the embodiments.

Some portions of the detailed description that follows are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as “processing” or “computing” or “calculating” or “determining” or “displaying” or the like, refer to the action and processes of a computer system, or similar electronic computing device, that manipulates and transforms data represented as physical (electronic) quantities within the computer system’s registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems will be apparent from the description below. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory (“ROM”); random access memory (“RAM”); magnetic disk storage media; optical storage media; flash memory devices; just to mention a few examples.

With reference now to FIG. 1, an image rendering system (or printing system) 100 suitable for implementing aspects of the exemplary embodiment is illustrated. The printing system 100 includes a user interface 110, a digital front end (DFE)

controller 120, and a print engine 130. The printing system 100 is generally assumed to be a printer, however, it is within the scope of the disclosure for the printing system 100 to be a copier. The print engine 130 has access to media 135 of various sizes and cost for a print job. A "print job" or "document" is normally a set of related sheets, usually one or more collated copy sets copied from a set of original print job sheets or electronic document page images, from a particular user, or otherwise related. For submission of a regular print job (or customer job), digital data is generally sent to the printing system 100. A sorter 140 operates after a job is printed by the print engine 130 to manage arrangement of the hard copy output, including cutting functions. A user can access and operate the printing system 100 using the user interface 1 10 or via a workstation 150. The workstation 150 communicates with the printing system 100 via a communications network 160. A user profile, work product for printing, media library, and print job parameters can be stored in a database or memory 170 accessible by the workstation 150 or the printing system 100 via the network 160, or can be directly accessed via the printing system 100. One or more color sensors (not shown), such as an RGB scanner, a spectral sensor with a photo detector or other such sensing device known in the art, may be embedded in the printer paper path.

The exemplary embodiment described below comprises several aspects of defining and using optimal test patches over the entire gamut for calibration. One aspect is the methodology of sampling during a characterization mode and sampling in an update (calibration) mode. Sampling in the convergence mode is performed with a large number of colors and over a range of print engine performance (environmental conditions, media, etc.). The fineness of the color sampling in such local variation is observed. For example, this initial sampling may need to be over the full 256 levels for each C, M, Y and K separation and their combinations. More likely, fewer levels, e.g., 13, may well characterize the printer gamut. For multi-media calibration, this set of colors patches may be printed and measured for each media. From this finely and broadly sampled state, basis vectors and an initial set of weights are derived using formalism such as Singular Value Decomposition on differences from a mean performance. The number of basis will be reduced to elimination noise and improve efficiency of computation, storage, and patch usage. The reduction in basis vectors is the low rank approximation of the system. Several of the patent applications on spatial Tone Reproduction Curves (or TRCs) describe this process. See, for example, U.S. application Ser. No. 11/314,670, U.S. Publication No. 2006/0077488, and U.S. Publication No. 2006/0077489, as noted above.

Figure 2:
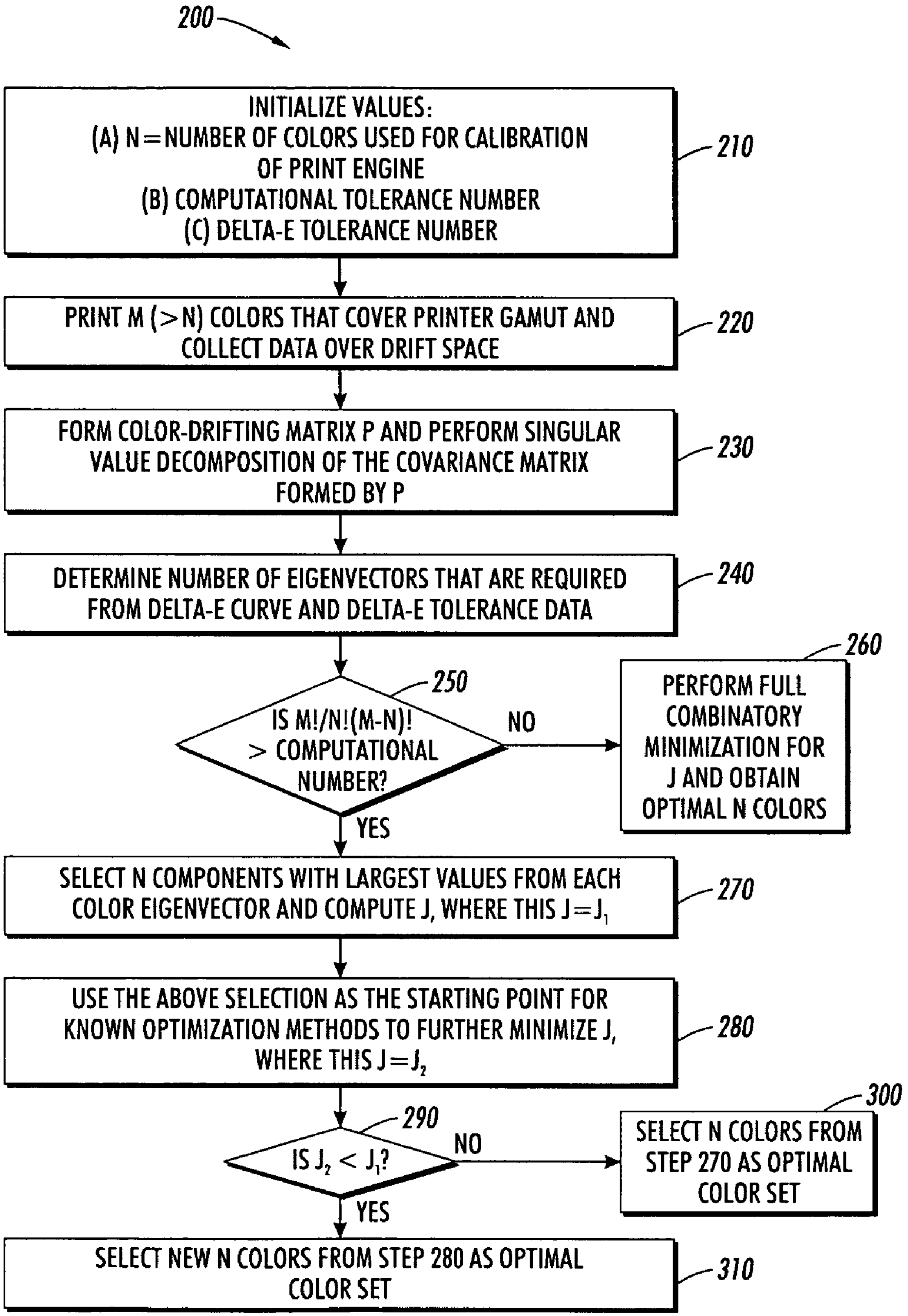
FIG. 2 is a flow chart of an exemplary optimal color calibration method.

Turning now to FIG. 2, an optimal color calibration method 200 is illustrated. Matrix notation is used due to its compact representation of data and operations on that data, but it is known to those skilled in the art that this notation (matrices, columns, vectors) can be interpreted in alternative forms, such as, e.g., simultaneous linear equations. Initially, in step 210, certain values are initialized, including (a) N, which is equal to the number of colors used for calibration of the print engine 130, (b) the computational tolerance number, and (c) the deltaE tolerance number. The computational tolerance number is the maximum number that one's computer could perform the full combinatory calculation, as shown in U.S. application Ser. No. 11/314,104, filed Dec. 21, 2005, entitled "SYSTEM AND METHOD FOR IMAGE BASED CONTROL USING INLINE SENSORS," by Zhigang Fan, et al., within a tolerable time. An exemplary number is 1 billion. The deltaE tolerance number specifies the required calibration accuracy.

In step 220, M (>N) colors are printed, where the M colors cover the printer gamut and data is collected over the drift space.

Figure 3:
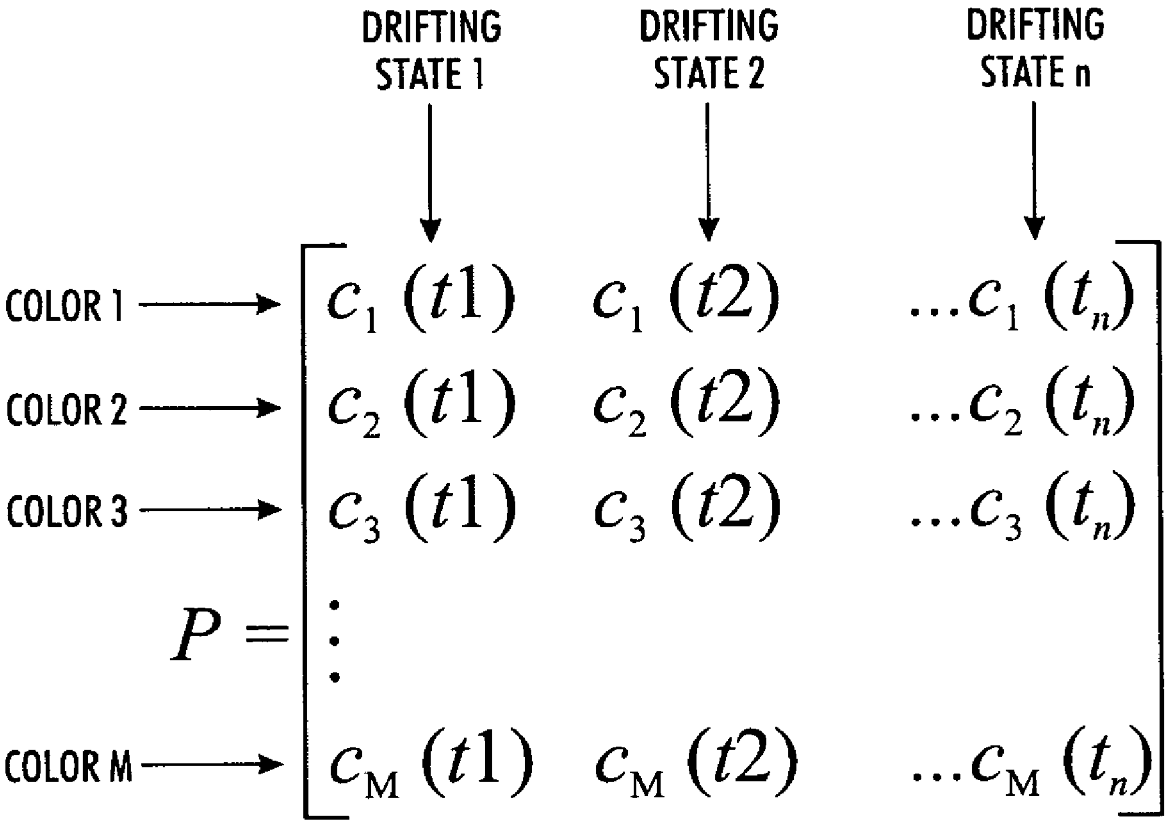
FIG. 3 illustrates the format of an exemplary color drifting data matrix P.

In step 230, the color-drifting data matrix P is formed, and Singular Value Decomposition of the covariance matrix formed by P, as described in the above-mentioned U.S. Pat. No. 5,749,020, is performed. An exemplary color-drifting data matrix P is shown in FIG. 3. Each color in FIG. 3 stands for the color's measured or specified value, such as L*, a*, b* or C, M, Y, K. The values of the M colors are collected into the matrix P over various drifting state of the printer. The drifting of the printer can be caused by the printing process, by environment such as temperature and humidity variation, or by material changes such as toner aging over time.

We need to apply principal component analysis ("PCA") to the data matrix P, which is a mathematical procedure that transforms a number of (possibly) correlated variables into a number of uncorrelated variables called principal components. The first principal component accounts for as much of the variability in the data as possible, and each succeeding component accounts for as much of the remaining variability as possible. Singular Value Decomposition ("SVD") is a mathematical operation performed to identify principal components. The SVD technique provides a representation of the multivariate data as a linear combination of orthonormal basis vectors, wherein each successive basis vector accounts for as much of the variation in the original data as possible. The singular values of the multivariate set of data correspond to orthonormal eigenvectors of the sample matrix ordered according to decreasing magnitude of eigen values.

Thus, the eigen functions may be obtained as follows:

$$SVD(PP^T)=U\Sigma V^T, \tag{1}$$

where the M×M matrix U and the M×M matrix V contain the eigen functions and the matrix Σ is diagonal and contains the square of the rank-ordered eignvalues (or singular values). Based on the ratios of the lowest to highest eigen values in the Σ matrix, one can decide on the total number of eigenvectors required for optimization.

Thus, in step 240, the number of eigenvectors that are required from the deltaE curve and the deltaE tolerance data are determined. That is, the average deltaE between the measured as given in the P matrix and the one with only the first s (s=1,2, . . . ) singular values after singular value decomposition is calculated. Then, the deltaE vs. s curve is plotted. The number of eigenvectors L is selected such that at this number deltaE in the curve is equal or below the tolerance.

In step 250, a determination is made as to whether M!/N! (M−N)! is greater than the computational tolerance number. If not, then a full combinatory minimization for J is performed and the optimal N colors are obtained (step 260).

It has been shown in U.S. application Ser. No. 11/314,670 that the optimization of prediction error J is equivalent to minimizing the trace of a matrix expressed as $tr[(H^TH)^{-1}]$. The matrix H has a dimension 3N×L, where N is the number of patches to be selected and L is the number of basis vectors. Usually there are too many possibilities to form the matrix H, so that a brute force search involving computing J for each possibility and comparing them to obtain the minimum is virtually impossible for most cases. Other conventional optimization methods, such as genetic algorithm and simulated annealing algorithm, are also difficult to handle the cases when the N and M are large. As such, an efficient sub-optimal searching method is described more fully below.

It is noted from the expression for J that, to first order approximation, the largest components for each eigenvector will make the smallest contribution to J. This is particularly true for a large N. As a result, m patches may be dedicated to each eigenvector, where m=N/L. The search is then conducted independently for each eigenvector. Specifically, m patches with the largest component magnitude from the first eigenvector are selected, then m patches with the largest component magnitude from the second eigenvector are selected, and so on. These patches selected can serve as the final solution, or as the starting patch set for other optimization algorithms, for example, the general optimization algorithm.

Thus, in step 270, N components with the largest values from each color eigenvector are selected and J is computed. In this case, let $J=J_1$. Assuming that each color eigenvector is a column vector with M components and s eigenvectors are required, there are many ways the largest N components of the eigenvectors can be selected. One example is to calculate the norm of each row of the s eigenvectors, compare, and then select the largest N rows In step 280, the above selection of N components is used as a starting point for known optimization methods to further minimize J, and, in this case, let $J=J_2$. The known optimization methods all require an initial guess. The better the initial guess, the faster the calculation and the greater the chance of getting globally optimized colors (optimization can be local or global).

In step 290, a determination is made as to whether $J_2<J_1$. If not, then N colors are selected from step 270 as the optimal color set (or test patches) (step 300). Otherwise, new N colors are selected from step 280 as the optimal color set (or test patches) (step 310).

The DFE controller 120 can perform all of these functions. It should be understood, however, that other options include performing these functions in a separate interface processor between the DFE controller 120 and the print engine 130. Also, the print engine processor can perform these functions.

Figure 4:
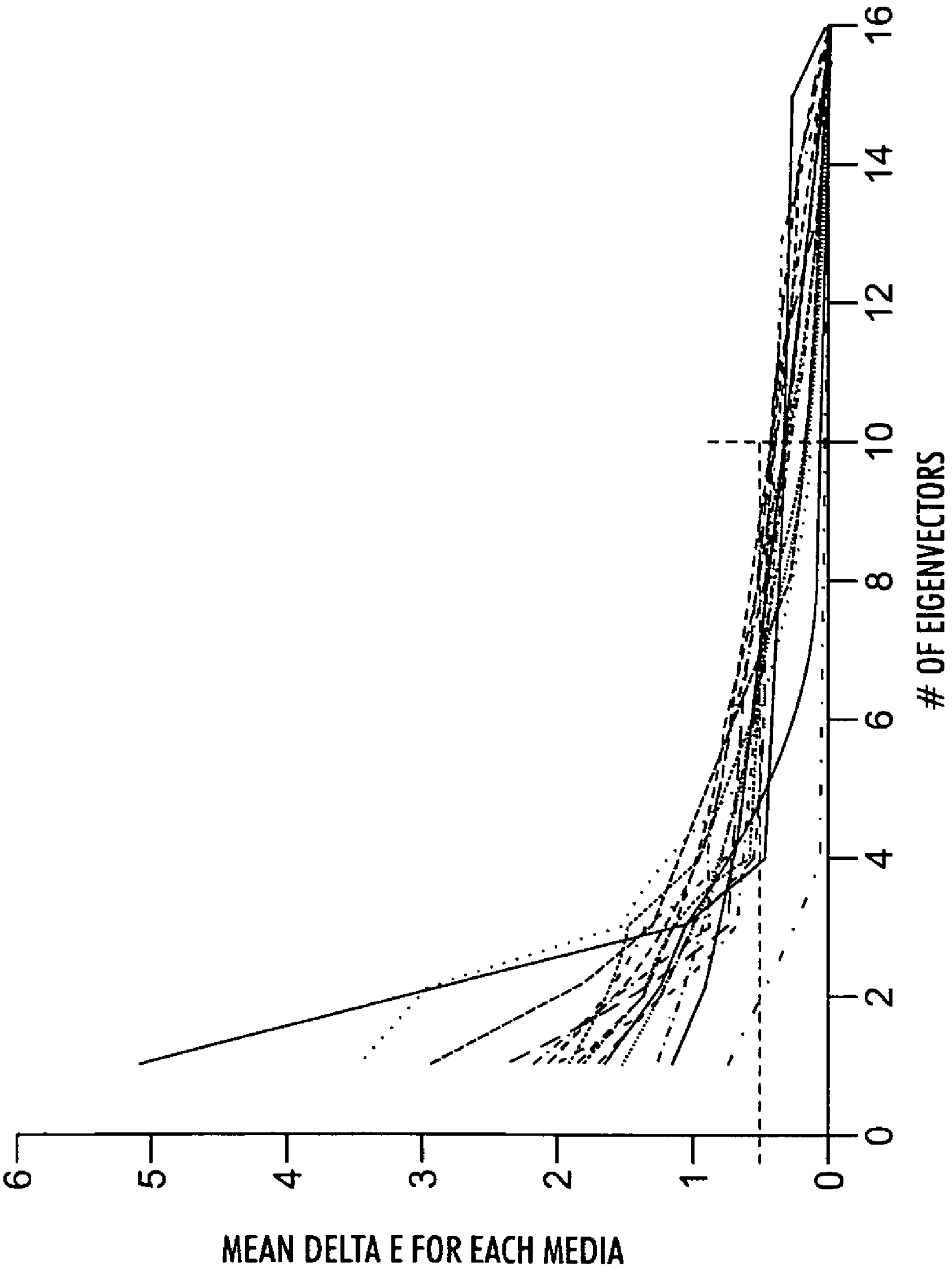
FIG. 4 is a graph of deltaE accuracy of seventeen media printed on a Xerox iGen3 printer as a function of basis vectors.

To illustrate the above optimization procedure, 182 optimized patches were obtained for a typical iGen3 gamut using the above mentioned method (so that they can be compared with the IT8 patch set). As noted earlier, in the case of multimedia calibration, the basis vectors could be obtained from a matrix that has color patches as one dimension and media as another dimension. Thus, FIG. 4 is the result for seventeen media with IT8 color patches printed from a Xerox iGen3 printer and shows how the low-rank approximation can be used to filter noise with a given accuracy requirement. For example, seven to eight basis vectors may be required in order to have calibration accuracy about 0.5 deltaE. This implies that only seven to eight media may be needed for full calibration, while the others may be updated through modeling. With the basis vectors selected, the focus is on how to obtain optimal patches with multi-media calibration as an example.

As seen from FIG. 4, about seven eigenvectors are needed in order to have calibration accuracy of 0.5 deltaE. Each eigenvector has 3131 patches as its dimension ($13^3=2197$ C,M,Y patches, plus 256 gray K patches, plus 182 IT8 patches, and 496 CM, MY, MK, CK, YK patches). Twenty-six out of 3131 patches with the largest component magnitude are selected for each eigenvector since 26×7=182. This set of patches form the starting point for the generic optimization algorithm. The J value for the 182 optimized patches is 14.8, while the J value for the 182 IT8 patches is 28.5. This shows that our optimized patch set is better suited for seventeen media calibration for iGen3 than IT8. The CYMK values for the optimal 182 patches together with those for IT8 are shown in the Appendix.

As another application, a set of optimized patches that would have about the same performance as one of the common set of patches, for example, IT8, but with less number of patches, can be obtained. Using fewer patches can save calibration time.

In the run time mode, the calibration patches created using the above-mentioned method can be printed, measured, and then used to update the 1D, 2D or 3D LUTs (look up tables) for color rendition either by a manufacture or by a customer.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of selecting optimal color test patches for an image: rendering system, the method comprising:

(a) initializing a set of values, where the set of values includes N number of colors used for calibration of the image rendering system, a computational tolerance number, and a delta-E tolerance number;

(b) printing M colors and collecting data over a drift space;

(c) forming by a controller, a color-drifting data matrix P and performing singular value decomposition of the covariance matrix formed by the color-drifting data matrix P to determine the eigen functions;

(d) determining the number of color eigenvectors that are required based on a delta-E curve and the delta-E tolerance number;

(e) where $M!/N!(M-N)!$ is greater than the computational tolerance number, selecting a plurality of components with the largest values from each color eigenvector and computing $J_1$;

(f) computing $J_2$ by minimizing $J_1$ further;

(g) where $J_2<J_1$, selecting N colors from step (f) as the optimal color test patches; and (h) where $J_2 \geqq J_1$, selecting N colors from step (e) as the optimal color test patches.

2. The method defined in claim 1, further comprising printing, measuring and using the optimal color test patches to update the 1D, 2D or 3D look up tables for color rendition.

3. The method defined in claim 1, wherein $J_1$ is computed in step (e) by minimizing the trace of a matrix expressed as $tr[(H^TH)^{-1}]$.

4. The method defined in claim 1, wherein the eigen functions in step (c) may be obtained according to the following equation:

$$SVD(PP^T)=U\Sigma V^T,$$

where the M×M matrix U and the M×M matrix V contain the eigen functions and the matrix Σ is diagonal and contains the square of the rank-ordered eignvalues (or singular values).

5. The method defined in claim 4, wherein $J_1$ is computed in step (e) by minimizing the trace of a matrix expressed as $tr[(H^TH)^{-1}]$.

6. An image rendering system comprising:

a user interface;

a print engine;

one or more color sensors;

a database; and a controller operative to:

(a) initialize a set of values, where the set of values includes N number of colors used for calibration of the image rendering system, a computational tolerance number, and a delta-E tolerance number;

(b) print M colors and collect data over a drift space;

(c) form a color-drifting data matrix P and perform singular value decomposition of the covariance matrix formed by the color-drifting data matrix P;

(d) determine the number of eigenvectors that are required from the delta-E curve and the delta-E tolerance data;

(e) where M!/N!(M−N)! is greater than the computational tolerance number, select a plurality of components with the largest values from each color eigenvector and compute $J_1$;

compute $J_2$ by minimizing $J_1$ further;

(g) select N colors from (f) as the optimal color test patches, where $J_2<J_1$; and (h) select N colors from (e) as the optimal color test patches, where $J_2 \geqq J_1$.

7. The image rendering system defined in claim 6, wherein the controller is further operative to print, measure and use the optimal color test patches to update the 1D, 2D or 3D look up tables for color rendition.

8. The image rendering system defined in claim 6, wherein the controller is further operative to compute $J_1$ by minimizing the trace of a matrix expressed as $tr[(H^TH)^{-1}]$.

9. The image rendering system defined in claim 6, wherein the controller is further operative to obtain the eigen functions according to the following equation:

$$SVD(PP^T)=U\Sigma V^T,$$

where the M×M matrix U and the M×M matrix V contain the eigen functions and the matrix Σ is diagonal and contains the square of the rank-ordered eignvalues (or singular values).

10. The image rendering system defined in claim 9, wherein the controller is further operative to compute $J_1$ by minimizing the trace of a matrix expressed as $tr[(H^TH)^{-1}]$.

11. A storage medium storing a set of program instructions executable on a data processing device and usable to select optimal color test patches for an image rendering system, the set of program instructions comprising:

(a) instructions for initializing a set of values, where the set of values includes N number of colors used for calibration of the image rendering system, a computational tolerance number, and a delta-E tolerance number;

(b) instructions for printing M colors and collecting data over a drift space;

(c) instructions for forming a color-drifting data matrix P and performing singular value decomposition of the covariance matrix formed by the color-drifting data matrix P;

(d) instructions for determining the number of eigenvectors that are required from the delta-E curve and the delta-E tolerance data;

(e) instructions for selecting a plurality of components with the largest values from each color eigenvector and computing $J_1$, where M!/N!(M−N)! is greater than the computational tolerance number;

(f) instructions for computing $J_2$ by minimizing $J_1$ further;

(g) instructions for selecting N colors from (f) as the optimal color test patches, where $J_2<J_1$; and (h) instructions for selecting N colors from (e) as the optimal color test patches, where $J_2 \geqq J_1$.

12. The storage medium defined in claim 11, wherein the set of program instructions further comprises instructions for printing, measuring and using the optimal color test patches to update the 1D, 2D or 3D look up tables for color rendition.

13. The storage medium defined in claim 11, wherein the set of program instructions further comprises instructions for computing $J_1$ by minimizing the trace of a matrix expressed as $tr[(H^TH)^{-1}]$.

14. The storage medium defined in claim 11, wherein the set of program instructions further comprises instructions for obtaining the eigen functions according to the following equation:

$$SVD(PP^T)=U\Sigma V^T,$$

where the M×M matrix U and the M×M matrix V contain the eigen functions and the matrix Σ is diagonal and contains the square of the rank-ordered eignvalues (or singular values).

15. The storage medium defined in claim 14, wherein the set of program instructions further comprises instructions for computing $J_1$ by minimizing the trace of a matrix expressed as $tr[(H^TH)^{-1}]$.

* * * * *